Figures 1, 2:
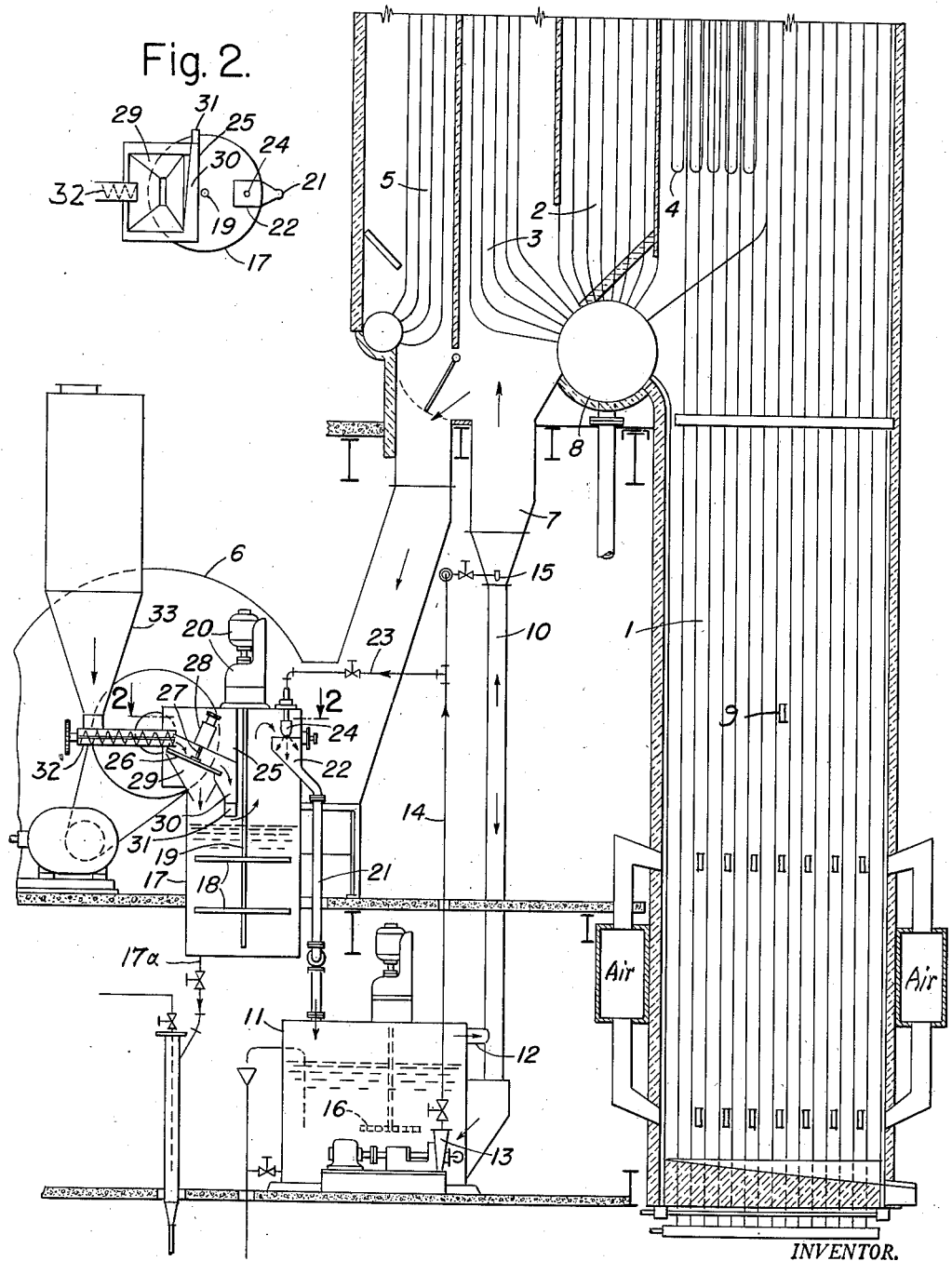

Jan. 22, 1952   F. W. HOCHMUTH   2,583,145
CHEMICAL FEEDER FOR BLACK LIQUOR RECOVERY SYSTEMS
Filed Oct. 15, 1947

INVENTOR.
Frank W. Hochmuth
BY

Patented Jan. 22, 1952

2,583,145

UNITED STATES PATENT OFFICE 2,583,145

CHEMICAL FEEDER FOR BLACK LIQUOR RECOVERY SYSTEMS

Frank W. Hochmuth, Brooklyn, N. Y., assignor to Combustion Engineering-Superheater, Inc., a corporation of Delaware Application October 15, 1947, Serial No. 779,927

3 Claims. (Cl. 23—262)

This invention relates to means for feeding chemical into a mixing tank and particularly to improved means for feeding salt cake into the salt cake mixing tank in a system for recovering chemical from the black liquor of wood pulp mills. The nature, objects and advantages of the invention will appear from the following.

Briefly, the system ordinarily employed comprises a smelter furnace from which the products of combustion pass through a waste heat boiler and thence through an evaporator. The black liquor from the digestion of the wood pulp is reduced to the desired density or concentration of solids and is then sprayed into the furnace wherein it is evaporated while in suspension to dryness sufficient to sustain combustion of the combustible matter in the chemical falling onto the hearth. Due to the heat of combustion on the hearth, reduction of chemical takes place and the reduced chemical runs from the hearth in a molten state. The chemical is then converted to so-called white liquor and reused as a solvent for the wood pulp in the digestors.

The products of combustion rising from the hearth into the furnace furnish the heat for evaporation of the sprayed-in black liquor. Some of the black liquor is carried upwardly through the boiler and thence into the evaporator where it is reclaimed in a bath of black liquor. In the evaporator the previously concentrated black liquor is brought up to a suitable density and is then conducted into the salt cake mixing tank wherein additional salt cake is added to the liquor. From the salt cake tank the liquor is pumped through suitable heaters to the nozzles by which it is sprayed into the furnace.

The feeding of the salt cake into the salt cake mixing tank has presented great difficulties in such a system. The salt cake is continuously fed into the tank by means, such as a screw conveyor, onto a screen preferably of the vibrating type. The screened salt cake falls directly into the salt cake mixing tank onto the surface of the black liquor whereupon it is stirred into and thoroughly mixed with the liquor by the tank agitator. As the incoming salt cake is discharged onto the screen and screened, a quantity of dust is produced at this point. The black liquor in the tank is hot (about 190 deg. F.) and evaporates a certain amount of vapor which unless vented passes up through the dust and around the screen causing clogging of the vibrating screen openings and also causing an objectionable discharge of salt cake dust and vapor in the area adjacent to this equipment.

It is an object of this invention to provide means for overcoming difficulties such as the foregoing.

A preferred form of apparatus for carrying out my invention is illustrated in the accompanying drawings, wherein—

Figure 1 is a diagrammatical illustration of a recovery system, shown partly in side elevation and partly in section; and Figure 2 is a section taken on the line 2—2 of Figure 1.

Referring to Figure 1, the reference numeral 1 denotes a furnace in the bottom of which is a smelting zone. This furnace is lined with exposed tubular water walls forming a part of the waste heat boiler and is of considerable height. Above and to one side of the furnace is the boiler proper. It has upright banks of tubes 2 and 3, baffled so that the gas stream from the boiler-furnace chamber passes into the upper portion of the first pass (extreme top of boiler furnace is not here shown) and thence downwardly over bank of tubes 2 and across the lower portion thereof and upwardly over the bank of tubes 3. Immediately in advance of the first pass of tubes, is a superheater 4 shielded by rows of boiler tubes. To the rear of the bank of tubes 3 is a down-pass in which a bank of tubes 5 is located. The waste gases leaving the boiler enter the evaporator 6 and eventually discharge into the duct to the stack (not shown). An induced draft fan (not shown) draws the gases through the evaporator 6 and to the stack. Hopper 7 is located immediately to the rear and below the mud drum 8 and communicates with the lower portion of the passes 2 and 3 of the boiler.

The black liquor from the mill after preliminary concentration in evaporators is fed to the evaporator 6 where it is reduced to the desired density. The dense liquor is led (by means not shown) to the spray nozzles 9 and sprayed into the furnace chamber where the spray encounters the ascending flame stream. The particles in gravitating to the hearth are dried and collect thereon in a bed. Air is admitted through the bed in an amount sufficient to maintain a reducing atmosphere. Reduction of the chemical takes place and it runs in molten form from off the hearth. The solid carbonaceous matter in the dried particles is burned. The combustibles in the gases rising from the bed encounter an oxidizing atmosphere and are burned. For this purpose additional air is admitted above the bed.

Chemical is, of course, present in the rising flame and gas stream in the form of vapor. This vapor is condensed by the absorption of heat by the steam generating and other surfaces of the boiler unit of the installation. It condenses largely in the form of dust, and due to the reversal of direction of the waste gas stream, from pass 2 to pass 3, the dust separates out and settles in the hopper 7. Such particles as deposit on the boiler tubes and other parts are, from time to time, removed therefrom by soot blowers or lances and also separate and settle out.

Referring now to the hopper 7, it will be seen that a conduit or down spout 10 leads from the hopper 7 to a tank 11 which contains water, weak wash liquor from the pulp mill or other suitable solvent. A branch pipe 12 connects spout 10 with the tank 11 above the liquor level.

In order to remove dust from the hopper as it settles out and collects therein, solvent is pumped from the tank 11 into hopper 7 by means of the pump 13 through pipe 14 and spray nozzle or nozzles 15 which washes the dust from the lower portions of the hopper 7. The discharged solvent returns to the tank 11 through down spout 10. By reason of this circulation of the solvent, the dust is removed substantially as rapidly as it collects in the hopper.

The chemical entering the tank 11 is dissolved, to facilitate which agitators 16 are provided. When the solution in the tank is sufficiently highly concentrated in chemical, a portion of the solution may be pumped from the tank to some suitable place for reintroduction into the system, as, for example, into the storage tank (not shown), or into evaporator 6. Make-up solvent is added to the tank 11 as required.

A salt cake mixing tank 17, which receives the heavy liquor from evaporator 6 through a pipe, not shown, contains agitators 18 on shaft 19 driven by a motor-speed reduction assembly 20. A suction vent pipe 21 terminates at its upper end in a hopper 22 inside of tank 17 and above the liquor level therein. The lower end of pipe 21 connects into top of the chemical ash dissolving tank 11. A branch pipe 23 from pipe 14 delivers solvent from tank 11 into hopper 22 through a spray nozzle 24.

A partition 25 divides the space in the upper portion of tank 17 into two compartments, one containing the vent hopper 22 and the other the salt cake feeding apparatus by which the liquor from evaporator 6 is enriched. This apparatus comprises a screen 26 fastened to the shaft 27 of a vibrating mechanism 28. Below the screen 26 are two hoppers 29 and 30, the latter adjoining partition 25. Hopper 29 discharges the screenings into the liquor in tank 17, and hopper 30 delivers the larger sized salt cake discharged from the top of the screen 26 into a trough 31 through which these larger salt cake lumps pass to a receptacle (not shown) outside of tank 17. Trough 31 is open to the atmosphere. The salt cake is delivered onto the screen 26 as by a screw 32 from the salt cake silo 33. The screw conveyor is fully enclosed. The enriched liquor leaves tank 17 via pipe 17a which conducts it to the pumps (not shown) and thence to nozzles 9 in the furnace 1.

According to the invention, the space above the liquor level in tank 17 is maintained under a negative pressure with respect to the atmosphere pressure via hopper 22 by the vent pipe 21 which opens into the top of the chemical ash dissolving tank 11. Tank 11 is maintained under a negative pressure by the connection of branch pipe 12 into down spout 10 which in turn is maintained under negative pressure by connection into the boiler passes through hopper 7.

In this manner the salt mixing tank 17 is kept under a slight negative pressure which causes a small amount of clean air to be drawn into trough 31 and hopper 30 through the vibrating screen 26 in a generally downward flow and thence through the space above the liquor level in tank 17 to the hopper 22. Entering hopper 22 this air then passes down through vent pipe 21 into ash dissolving tank 11, through branch pipe 12, up down spout 10 and into the boiler passes. The air thus moving downwardly across screen 26 will remove the vapors and fine salt cake dust which heretofore caused the clogging of the screen.

To prevent deposits of salt dust in hopper 22 and vent pipe 21, a spray of liquor is directed downwardly into the vent hopper 22 through spray nozzles 24 which causes the sides of the hopper and the pipe to be washed free of any such salt cake deposits. This spray liquor is tapped off from the liquor circulating line 14 through pipe 23 and comprises a portion of the liquor which is generally employed to wash down the ash hopper 7. The liquor sprayed into hopper 22 drains by gravity back into the chemical ash dissolving tank 11 and has become enriched a slight amount by the dust produced in the salt cake mixing tank 17.

While the preferred embodiment of my invention has been shown and described, it will be understood that changes in construction, combination and arrangement of parts may be made without departing from the spirit and scope of the invention as claimed.

I claim:

1. In a system for recovering chemical from the black liquor of wood pulp mills, the combination of a boiler heated by combustion gases produced by a burning of said liquor and including a pass wherein pressure is below atmospheric value, an evaporator for concentrating the black liquor coming into the system, a salt cake mixing tank receiving said concentrated liquor from the evaporator, a screen positioned in the upper portion of said tank, feeder means for delivering incoming salt cake upon the screen whereby fine particles thereof will pass through the screen while oversize salt lumps will be rejected by the screen, a trough leading from the screen to the tank exterior and to atmosphere and serving to carry said rejected salt lumps out of the tank, partition means dividing the tank's upper interior into two compartments the first of which includes said trough plus communicating space embracing the feed side of the screen and the second of which includes another portion of the aforesaid upper tank interior that is in communication with the discharge side of said screen, an exhauster conduit opening into said second compartment, and means connecting said conduit with said boiler pass whereby the aforesaid sub-atmospheric pressure in that pass creates in the conduit and second compartment a suction which draws through said screen from the feed to the discharge side thereof air that carries away from the screen liquor vapors and salt dust which otherwise would cause clogging of the screen openings.

2. In a system for recovering chemical from the black liquor of wood pulp mills, the combination of a boiler with heating furnace wherein said black liquor is burned, a chemical ash dissolving tank, an evaporator for concentrating the black liquor coming into the system, a salt cake mixing tank receiving said concentrated liquor from the evaporator, a screen positioned in the upper portion of said mixing tank, feeder means for delivering incoming salt cake upon the screen whereby fine particles thereof will pass through the screen while oversize salt lumps will be rejected by the screen, means forming a passage leading from the screen to the mixing tank exterior and to atmosphere and serving to carry said rejected salt lumps out of the mixing tank, a partition dividing the mixing tank's upper interior into two compartments the first of which includes said passage plus communicating space above the upper side of said screen and the second of which includes another portion of the aforesaid upper tank interior that is in communication with the lower side of said screen, an exhauster tube opening into said second compartment and connected into the upper space of said chemical ash dissolving tank, and a down spout connecting said space in said dissolving tank into a pass of said boiler furnace wherein the pressure is below atmospheric value whereby to create in said exhauster tube and second compartment of the mixing tank a suction which draws downwardly through said screen air from said first compartment that carries away from the screen liquor vapors and salt dust which otherwise would cause clogging of the screen openings.

3. In a system for recovering chemical from the black liquor of wood pulp mills, the combination of a boiler and furnace for generating steam from the heat content of said liquor, evaporating means for concentrating the black liquor prior to introduction into the boiler furnace, a chemical ash dissolving tank, a salt cake mixing tank receiving said concentrated liquor from the evaporator, a screen positioned in the upper portion of said mixing tank, feeder means for delivering incoming salt cake upon the screen whereby fine particles thereof will pass through the screen while oversize salt lumps will be rejected by the screen, a trough leading from the screen to the mixing tank exterior and to atmosphere and serving to carry said rejected salt lumps out of the mixing tank, means dividing the mixing tank's upper interior into two compartments the first of which includes said trough plus communicating space above the upper side of said screen and the second of which includes another portion of the aforesaid upper tank interior that is in communication with the lower side of said screen, an exhauster tube opening into said second compartment and extending downwardly into the upper space of said ash dissolving tank, a down spout connecting said space in said dissolving tank into a pass of said boiler furnace wherein the pressure is below atmospheric value whereby to create in said exhauster tube and second compartment of the mixing tank a suction which draws downwardly through said screen air from said first compartment that carries liquor vapors and salt dust away from the screen, conduits for conducting solvent from said dissolving tank into the top of said exhauster tube and into the top of said downspout to prevent salt and chemical from accumulating inside the tube and inside the spout, and pump means for delivering the solvent through said conduits.

FRANK W. HOCHMUTH.

REFERENCES CITED

The following references are of record in the file of this patent:

UNITED STATES PATENTS

| Number | Name | Date |
|---|---|---|
| 2,281,140 | Courthope | Apr. 28, 1942 |
| 2,340,154 | Stone | Jan. 25, 1944 |
| 2,395,258 | Drake | Feb. 19, 1946 |